US012624153B2

(12) United States Patent
Song et al.

(10) Patent No.: US 12,624,153 B2
(45) Date of Patent: May 12, 2026

(54) MODIFIED POLYURETHANE PREPOLYMER, TWO-COMPONENT POLYURETHANE ADHESIVE AND PREPARATION METHOD THEREOF

(71) Applicant: GUANGZHOU BAIYUN TECHNOLOGY CO., LTD., Guangdong (CN)

(72) Inventors: Jun Song, Guangdong (CN); Long Tang, Guangdong (CN); Jianjun Chen, Guangdong (CN); Hengchao Huang, Guangdong (CN); Mingsong Miao, Guangdong (CN)

(73) Assignee: Guangzhou Baiyun Technology Co., Ltd., Guangdong (CN)

( * ) Notice: Subject to any disclaimer, the term of this patent is extended or adjusted under 35 U.S.C. 154(b) by 705 days.

(21) Appl. No.: 17/965,748

(22) Filed: Oct. 13, 2022

(65) Prior Publication Data

US 2023/0087542 A1 Mar. 23, 2023

Related U.S. Application Data

(63) Continuation of application No. PCT/CN2020/139812, filed on Dec. 28, 2020.

(30) Foreign Application Priority Data

Apr. 16, 2020 (CN) ......................... 202010300025.9

(51) Int. Cl.

*C08G 18/62* (2006.01)
*C08G 18/12* (2006.01)
*C08G 18/73* (2006.01)
*C08G 18/75* (2006.01)
*C08K 3/04* (2006.01)

(Continued)

(52) U.S. Cl.

CPC ......... *C08G 18/6283* (2013.01); *C08G 18/12* (2013.01); *C08G 18/73* (2013.01); *C08G 18/755* (2013.01); *C08K 3/042* (2017.05); *C09J 11/04* (2013.01); *C09J 175/08* (2013.01)

(58) Field of Classification Search

CPC .... C08G 18/6283; C08G 18/12; C08G 18/73; C08G 18/755; C08G 18/0866; C08G 18/3206; C08G 18/3215; C08G 18/4825; C08G 18/6229; C08G 18/30; C08K 3/042; C08K 2003/2227; C09J 11/04; C09J 175/08; C09J 175/06; C09J 175/04; C08F 220/36

See application file for complete search history.

(56) References Cited

U.S. PATENT DOCUMENTS

| | | | |
|---|---|---|---|
| 2004/0034190 A1 | 2/2004 | Janssen et al. |
| 2011/0251364 A1 | 10/2011 | Anthamatten et al. |
| 2016/0167323 A1 | 6/2016 | Valeri et al. |

FOREIGN PATENT DOCUMENTS

| | | |
|---|---|---|
| CA | 2667520 | 5/2008 |
| CN | 104151503 | 11/2014 |

(Continued)

OTHER PUBLICATIONS

Lewis_Soft Matter_2013, 9, 4058 (Year: 2013).*

(Continued)

*Primary Examiner* — Mark Eashoo
*Assistant Examiner* — Zhen Liu
(74) *Attorney, Agent, or Firm* — JCIPRNET

(57) ABSTRACT

The present invention relates to a modified polyurethane prepolymer, a two-component polyurethane adhesive and the preparation method thereof. The modified polyurethane prepolymer is prepared from the raw materials comprising the following components: polyurethane prepolymer and graphene oxide; wherein, the polyurethane prepolymer is prepared from the raw materials comprising the following components: copolymer containing ureidopyrimidinone groups and aliphatic isocyanate; wherein, the copolymer containing ureidopyrimidinone groups is formed by copolymerization of the raw materials comprising the following components: alkyl acrylate ureidopyrimidinone, and hydroxyethyl alkyl acrylate; wherein, the alkyl acrylate ureidopyrimidinone has the structure shown in Formula (I); and the hydroxyethyl alkyl acrylate has the structure shown in Formula (II). The two-component polyurethane adhesive containing the modified polyurethane prepolymer has excellent mechanical properties and aging resistance simultaneously.

(I)

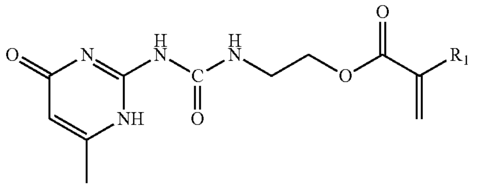

(II)

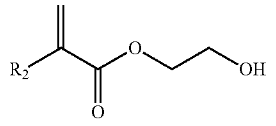

19 Claims, No Drawings

(51) Int. Cl.
*C09J 11/04* (2006.01)
*C09J 175/08* (2006.01)

(56) References Cited

FOREIGN PATENT DOCUMENTS

| | | |
|---|---|---|
| CN | 104231157 | 12/2014 |
| CN | 104892871 | 9/2015 |
| CN | 106674996 | 5/2017 |
| CN | 106978128 | 7/2017 |
| CN | 107154512 | 9/2017 |
| CN | 111484597 | 8/2020 |
| EP | 1219416 | 7/2002 |
| EP | 1797867 | 6/2007 |
| JP | 2008274217 | 11/2008 |
| JP | 105417526 | 3/2016 |
| JP | 108059693 | 5/2018 |
| JP | 2019107623 | 7/2019 |
| KR | 20120046468 | 5/2012 |
| TW | 201905151 | 2/2019 |

OTHER PUBLICATIONS

"International Search Report (Form PCT/ISA/210) of PCT/CN2020/139812", mailed on Mar. 31, 2021, with English translation thereof, pp. 1-6.

Yunhua Chen et al., "Graphene Oxide Hybrid Supramolecular Hydrogels with Self-Healable, Bioadhesive and Stimuli-Responsive Properties and Drug Delivery Application," Macromolecular Materials and Engineering, Jun. 2018, pp. 1-11.

Taylor Ware et al., "Triple-Shape Memory Polymers Based on Self-Complementary Hydrogen Bonding," Macromolecules, Jan. 2012, pp. 1062-1069.

Li Zhenlong et al., "Synthesis and characterization of hydroxyl-terminated ureidopyrimidone monomer and its grafted linear polyurethane," Journal of Functional Materials, Jan. 2019, pp. 01178-01182.

* cited by examiner

MODIFIED POLYURETHANE PREPOLYMER, TWO-COMPONENT POLYURETHANE ADHESIVE AND PREPARATION METHOD THEREOF

CROSS-REFERENCE TO RELATED APPLICATION

The present application is a continuation of PCT application No. PCT/CN2020/139812, filed on Dec. 28, 2020, which claims the priority of China Patent Application No. 202010300025.9, filed on Apr. 16, 2020. The entirety of each of the above mentioned patent applications is incorporated by reference herein and made a part of this specification.

TECHNICAL FIELD

The present disclosure relates to the technical field of adhesives, in particular to a modified polyurethane prepolymer, a two-component polyurethane adhesive and the preparation method thereof.

DESCRIPTION OF RELATED ART

Two-component polyurethane adhesive is widely used in automobile, woodworking, food packaging, civil construction and other fields because of its advantages of strong adhesion, adjustable curing rate, and strong performance designability. It has become the PU adhesive product with the largest variety and output. However, although aromatic polyurethane adhesive has strong mechanical properties, it has the defect of easy yellowing and aging, which restricts the high-end development of two-component polyurethane adhesives.

There are roughly two methods to solve the above-mentioned problems. One method is to add anti-aging agents or inorganic fillers that can absorb ultraviolet radiation. This method can only delay aging to a certain extent, but yellowing and aging will still occur when the exposure to natural light becomes longer. Therefore, this method cannot fundamentally eliminate the yellowing and aging of the polyurethane adhesive, and moreover, adding too much anti-yellowing agent or filler will affect the overall mechanical properties of the polyurethane adhesive. Another method is to solve the yellowing problem from the design of molecular structure, such as changing the raw material of aromatic isocyanate to aliphatic isocyanate. This method can effectively avoid yellowing. However, it also significantly reduces the mechanical strength of the polyurethane colloid, which consequently cannot be used as structural bonding for metals or other materials.

Therefore, the development of polyurethane adhesives with excellent mechanical properties and resistance to yellowing and aging is of great significance for the high-end expansion of the polyurethane adhesive industry.

SUMMARY

Based on the above, one of the objects of the present disclosure is to provide a new type of two-component polyurethane adhesive with excellent mechanical properties and aging resistance simultaneously.

In order to achieve the purpose above, the present disclosure firstly provides a modified polyurethane prepolymer, and the two-component polyurethane adhesive comprising said modified polyurethane prepolymer, which has excellent mechanical properties and aging resistance simultaneously.

The specific technical solutions are as follows.

A modified polyurethane prepolymer, is prepared from the raw materials comprising the following components: polyurethane prepolymer and graphene oxide; wherein said polyurethane prepolymer is prepared from the raw materials including the following components: copolymer containing ureidopyrimidinone groups, and aliphatic isocyanate; wherein said copolymer containing ureidopyrimidinone groups is formed by copolymerization of the raw materials including the following components: alkyl acrylate ureidopyrimidinone, and hydroxyethyl alkyl acrylate; wherein, said alkyl acrylate ureidopyrimidinone has the structure shown in Formula (I):

(I)

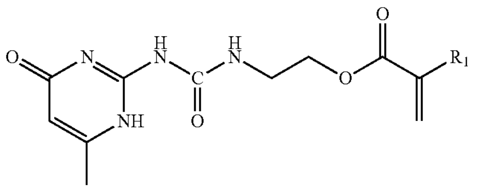

said hydroxyethyl alkyl acrylate has the structure shown in Formula (II):

(II)

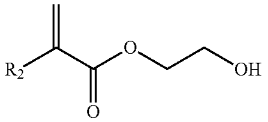

wherein, $R_1$ is $C_1$-$C_6$ alkyl; $R_2$ is H, or $C_1$-$C_6$ alkyl.

In some embodiments, the copolymer containing ureidopyrimidinone groups has the structure shown in Formula (III):

(III)

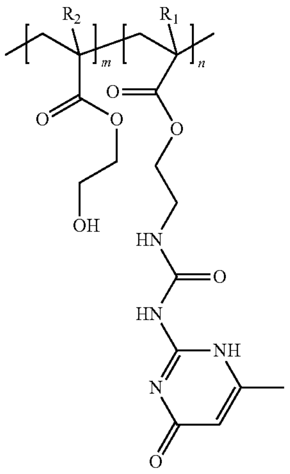

wherein, n is 1-100, m is 1-10; $R_1$ is $C_1$-$C_6$ alkyl; $R_2$ is H or $C_1$-$C_6$ alkyl.

In some embodiments, the aliphatic isocyanate is at least one of the following: hexamethylene diisocyanate (HDI), 4,4'-dicyclohexylmethane diisocyanate (HMDI), isophorone diisocyanate (IPDI), 1,4-cyclohexyl diisocyanate and methylcyclohexyl diisocyanate (HTDI).

In some embodiments, the modified polyurethane prepolymer has the structure shown in Formula (IV):

(IV)

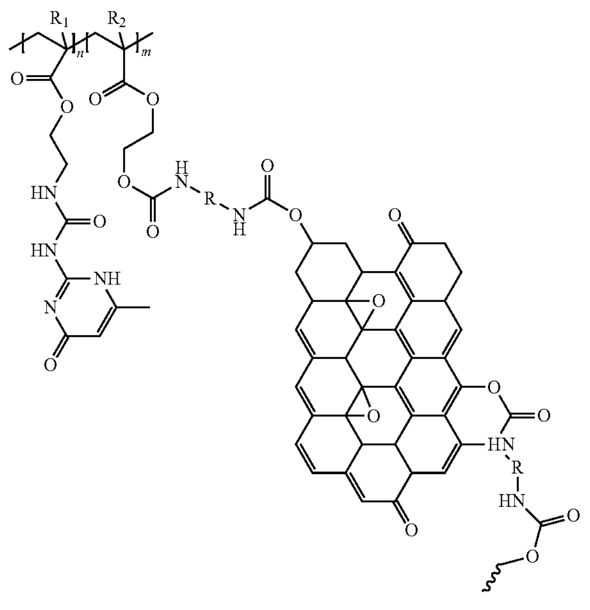

wherein, n is 1-100, m is 1-10; $R_1$ is $C_1$-$C_6$ alkyl; $R_2$ is H or $C_1$-$C_6$ alkyl; and R is $-(CH_2)_6-$,

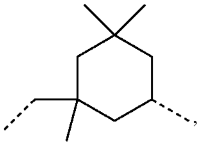,
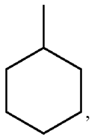,
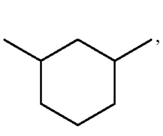,
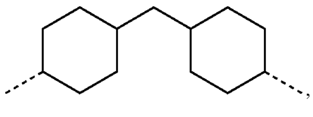, or
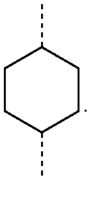.

In some embodiments, $R_1$ is methyl.

In some embodiments, $R_2$ is H or methyl.

In some embodiments, a mass ratio of the alkyl acrylate ureidopyrimidinone, the hydroxyethyl alkyl acrylate, the aliphatic isocyanate and the graphene oxide is 100:(5-20):(60-90):(1-30).

In some embodiments, the mass ratio of the alkyl acrylate ureidopyrimidinone, the hydroxyethyl alkyl acrylate, the aliphatic isocyanate and the graphene oxide is 100:(8-12):(75-85):(15-25).

In some embodiments, the NCO content of the modified polyurethane prepolymer is 11%-14%, and its viscosity at 25° C. is 30000 mPa·s-70000 mPa·s.

The present disclosure also provides a method for preparing the above-mentioned modified polyurethane prepolymer.

The specific technical solutions are as follows.

A preparation method of the above-mentioned modified polyurethane prepolymer, comprising the following steps:

step 1: dissolving a chain transfer agent, together with the alkyl acrylate ureidopyrimidinone, hydroxyethyl alky acrylate and an initiator in an organic solvent to carry out a copolymerization reaction to obtain a copolymer containing the ureidopyrimidinone groups;

step 2: adding the aliphatic isocyanate to the mixed solution after the reaction in step 1 to react, and obtaining the polyurethane prepolymer; and step 3: adding the graphene oxide to the mixed solution after the reaction in step 2 to react, and obtaining the modified polyurethane prepolymer.

In some embodiments, the chain transfer agent is at least one of the following: cumyl dithiobenzoate, tert-butyl benzodithioate, bis(benzylsulfanyl)methanethione and 2-phenyl-2-propylbenzodithioate.

In some embodiments, the initiator is azobisisobutyronitrile and/or benzoyl peroxide.

In some embodiments, the amount of the chain transfer agent is 0.1 wt %-2 wt % of the alkyl acrylate ureidopyrimidinone.

In some embodiments, the amount of the initiator is 0.1 wt %-2 wt % of the alkyl acrylate ureidopyrimidinone.

In some embodiments, the reaction is carried out under nitrogen or inert gas protection.

In some embodiments, the temperature of the copolymerization reaction in step 1 is 50° C.-70° C., and the time of the copolymerization reaction is 6 hours-18 hours.

In some embodiments, the temperature of the reaction in step 2 is 20° C.-30° C., and the reaction time is 18 hours-28 hours.

In some embodiments, the temperature of the reaction in step 3 is 20° C.-30° C., and the reaction time is 1 hour-3 hours.

In some embodiments, the preparation method of the alkyl acrylate ureidopyrimidinone comprises the following steps: adding 2-amino-4-hydroxy-6-methylpyrimidine into an organic solvent, after it is dissolved, adding isocyanoethyl methacrylate to react, and obtaining alkyl acrylate ureidopyrimidinone.

In some embodiments, the mass ratio of the 2-amino-4-hydroxy-6-methylpyrimidine and the isocyanoethyl methacrylate is 1:(1-2).

In some embodiments, the temperature of the reaction is 20-30° C., and the reaction time is 20 minutes-60 minutes.

The present disclosure also provides a two-component polyurethane adhesive, which has excellent mechanical properties and aging resistance simultaneously.

The specific technical solutions are as follows.

A two-component polyurethane adhesive, comprising component A and component B; in parts by weight, the component A is prepared from the raw materials comprising the following components: 100 parts of polyol; 0.01 parts~5 parts of catalyst; and 50 parts~100 parts of inorganic filler, and the component B is the above-mentioned modified polyurethane prepolymer.

In some embodiments, the component A is prepared from the raw materials comprising the following components: 100 parts of polyol; 0.5 parts~1.5 parts of catalyst; and 65 parts~75 parts of inorganic filler.

In some embodiments, the mass ratio of the component A and the component B is (1-3):1.

In some embodiments, the polyol is one or more of the following: phenyl-modified polyether polyol, polyether polyol, polyester polyol and short-chain polyol.

In some embodiments, the viscosity of the polyol at 25° C. is 1000 cps-5000 cps.

In some embodiments, the polyol is Sovermol® 815, STEPANPOL PS-2002, and Sovermol® 1092 in a mass ratio of 5:2-4:1-3.

In some embodiments, the catalyst is an organotin catalyst and/or a tertiary amine catalyst. The organotin catalyst can be, for example, dibutyltin dilaurate, stannous octoate, and the like; and the tertiary amine catalyst can be, for example, triethylenediamine, triethanolamine, triethylamine, and the like.

In some embodiments, the inorganic filler is at least one of the following: ultrafine calcium carbonate, nano-calcium carbonate and aluminum hydroxide.

In some embodiments, the particle size of the aluminum hydroxide ranges from 1000 mesh to 2000 mesh.

In some embodiments, the dehydrating agent is a liquid type and/or a solid type. The liquid dehydrating agent can be monocyclic or bicyclic oxazolidine; and the solid dehydrating agent can be ultrafine molecular sieve, ultrafine sodium sulfate, ultrafine calcium sulfate, and the like.

The present disclosure also provides a preparation method of the above-mentioned two-component polyurethane adhesive.

The specific technical solutions are as follows.

A preparation method of the above-mentioned two-component polyurethane adhesive, comprising the following steps:

Preparation of the component A: mixing the polyol with the inorganic filler, then adding the catalyst, stirring and dispersing, and vacuum defoaming to obtain the component A;

Preparation of the Component B:

step 1: dissolving a chain transfer agent, together with the alkyl acrylate ureidopyrimidinone, hydroxyethyl alky acrylate and an initiator in an organic solvent to carry out copolymerization reaction to obtain a copolymer containing the ureidopyrimidinone groups;

step 2: adding the aliphatic isocyanate to the mixed solution after the reaction in step 1 to react, and obtaining the polyurethane prepolymer;

step 3: adding the graphene oxide to the mixed solution after the reaction in step 2 to react, and obtaining the modified polyurethane prepolymer.

In some embodiments, the chain transfer agent is at least one of the following: cumyl dithiobenzoate, tert-butyl benzodithioate, bis(benzylsulfanyl)methanethione and 2-phenyl-2-propylbenzodithioate.

In some embodiments, the initiator is azobisisobutyronitrile and/or benzoyl peroxide.

In some embodiments, the amount of the chain transfer agent is 0.1 wt %-2 wt % of the alkyl acrylate ureidopyrimidinone.

In some embodiments, the amount of the initiator is 0.1 wt %-2 wt % of the alkyl acrylate ureidopyrimidinone.

In some embodiments, the reaction is carried out under nitrogen or inert gas protection.

In some embodiments, the temperature of the copolymerization reaction in step 1 is 50° C.-70° C., and the time of the copolymerization reaction is 6 hours-18 hours.

In some embodiments, the temperature of the reaction in step 2 is 20° C.-30° C., and the reaction time is 18 hours-28 hours.

In some embodiments, the temperature of the reaction in step 3 is 20° C.-30° C., and the reaction time is 1 hour-3 hours.

In some embodiments, the preparation method of the alkyl acrylate ureidopyrimidinone comprises the following steps: adding 2-amino-4-hydroxy-6-methylpyrimidine into an organic solvent, after it is dissolved, adding isocyanoethyl methacrylate to react, and obtaining alkyl acrylate ureidopyrimidinone.

In some embodiments, the mass ratio of the 2-amino-4-hydroxy-6-methylpyrimidine and the isocyanoethyl methacrylate is 1:1-2.

In some embodiments, the temperature of the reaction is 20-30° C., and the reaction time is 20-60 minutes.

Compared with the prior art, the present disclosure has the following advantages and beneficial effects.

In the present disclosure, ureidopyrimidinone and graphene oxide are introduced into the aliphatic polyurethane chain to obtain a modified polyurethane prepolymer, and a two-component polyurethane adhesive comprising the modified polyurethane prepolymer is further obtained. Ureidopyrimidinone has a quadruple hydrogen bond and when it is introduced into the aliphatic polyurethane chain, it can improve the mechanical strength of the traditional aliphatic polyurethane adhesives without affecting the anti-aging performance. Ureidopyrimidinone further cooperates with the graphene introduced into the main chain of polyurethane to greatly improve the mechanical strength and aging resistance of the polyurethane adhesives. This also improves the flame-retardant properties, high and low temperature resistance and high humidity resistance of the polyurethane adhesives, therefore, the two-component polyurethane adhesive of the present disclosure has excellent adhesion performance and outstanding aging resistance.

Compared with the aromatic polyurethane structural adhesive, the two-component polyurethane adhesive of the present disclosure has outstanding advantages not only in mechanical properties, but also in weather resistance, therefore, the practicability of the two-component polyurethane adhesive of the present disclosure is significantly improved, and it has potential application value in some engineering fields with strict requirements on sealant conditions.

DESCRIPTION OF THE EMBODIMENTS

In the following embodiment of the present disclosure, the experimental methods without specific conditions usually follow conventional conditions, or the specific conditions as recommended by the manufacturer. The various common chemical reagents used in the embodiments are commercially available products.

Unless otherwise defined, all technical and scientific terms used in the present disclosure are the same as commonly understood by those skilled in the art of the present disclosure. The terms used in the description of the present disclosure are only for the purpose of describing specific embodiments, but do not limit the present invention.

The terms “including” and “having” and any variation thereof in the present disclosure are intended to cover the non-exclusive inclusions. For example, a process, method, device, product, or equipment that includes a series of steps is not limited to the steps or modules that are already listed, but selectively includes steps that are not listed, or includes other steps inherent to these processes, methods, products, or equipment.

In the present disclosure, "multiple" refers to two or more. "And/or" describes the association relationship of the associated objects, indicating that there can be three types of relationships. For example, "A and/or B" indicates that three situations: A exists alone, A and B exist at the same time, and B exists alone. The character "I" generally indicates that the context objects are in an "or" relationship.

The present disclosure will be further described in detail as below.

The normal temperature or room temperature involved in the following examples refers to the indoor temperature is 10° C.-30° C.

Example 1

The present embodiment provided a novel two-component polyurethane adhesive, which is composed of Component A and Component B with a mass ratio of 1:1; wherein:

The preparation method of Component A is as follows:

50 parts by weight of polyol of type BASF Sovermol® 815, together with 30 parts by weight of polyol of type of STEPANPOL PS-2002, 20 parts by weight of polyol of type of BASF Sovermol® 1092 Alcohol and 70 parts by weight of 2000 mesh aluminum hydroxide (purchased from Foshan Sanshui Jinge New Material Co., Ltd.) were added to a reaction kettle and stirred at room temperature for 20 minutes; then added 1 part by weight of stannous octoate into the reaction kettle, and stirred and dispersed at room temperature for 1 hour, vacuum defoamed to obtain Component A, whose viscosity at 25° C. was 12000 mPa·s.

Wherein, Sovermol®815 is a polyester polyol with a viscosity of 4500-4900 mPa·s at 25° C.; PS-2002 is a polyester polyol with a viscosity of 3000-3200 mPa·s at 25° C.; and ®1092 is a polyether polyol with a viscosity of 2000-2300 mPa·s at 25° C.

The preparation method of Component B is as follows:

Step 1: Preparation of Intermediate 1

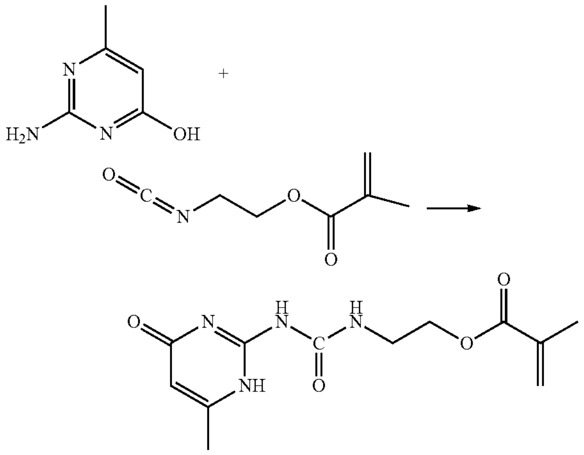

Intermediate 1

100 parts of 2-amino-4-hydroxy-6-methylpyrimidine was added into 200 parts of anhydrous N, N-dimethylformamide (DMF), after it was completely dissolved quickly added 132 parts of isocyanoethyl methacrylate and reacted at 25° C. for half an hour. After the reaction completed, most of the solvent was removed by rotary evaporation, and the remaining solution was washed and dried to obtain a white product, namely Intermediate 1, with a yield of 95.2%.

The H NMR spectrum of Intermediate 1 (deuterated chloroform, ppm): there were three N—H peaks with chemical shifts between 10.2 and 13.1; one C═C—$H_2$ peak with chemical shifts at 6.21 and 5.55 respectively; one C—H peak on the pyrimidine ring with a chemical shift near 5.80; one O—$CH_2$ peak with a chemical shift between 4.25 and 4.28; one N—$CH_2$ peak with a chemical shift at 3.58; and multiple methyl peaks with chemical shifts between 1.88 and 2.25.

The infrared spectrum of Intermediate 1: 1660 $cm^{-1}$ was the carbonyl peak of carbamate; 1698 $cm^{-1}$ was the peak of the carbonyl on the pyrimidine aromatic ring; 1725 $cm^{-1}$ was the carbonyl peak of ester bond, and 3038 $cm^{-1}$ was the peak of carbon-carbon double bond.

Step 2: Preparation of Intermediate 2

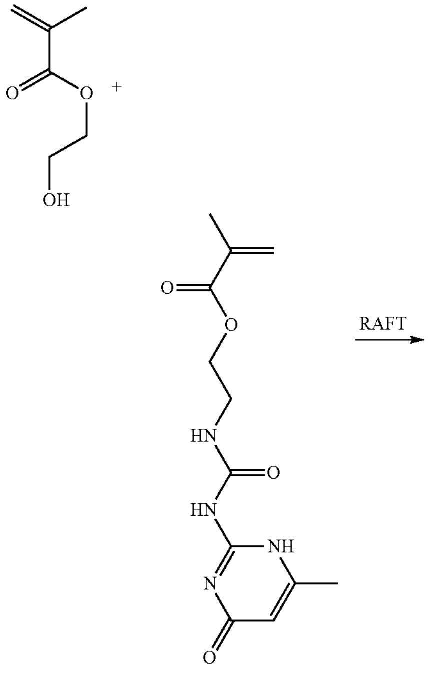

Intermediate 1

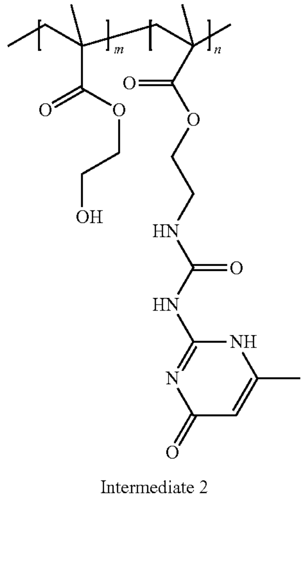

Intermediate 2

(wherein, n = 19, m = 4)

1 part by weight of chain transfer agent cumyl dithiobenzoate, together with 100 parts by weight of Intermediate 1 prepared in step 1, 10 parts by weight of hydroxyethyl methacrylate and 1 part by weight of azobisisobutyronitrile were dissolved in 250 parts by weight of anhydrous N,N-dimethylformamide; after the reaction device was sealed, it underwent three cycles of freezing-vacuuming-thawing-nitrogen flowing to ensure that the reaction was carried out under anhydrous and oxygen-free conditions. The reaction was carried out at 60° C. for 12 hours to obtain Intermediate 2 for the next reaction directly without purification.

The infrared spectrum of Intermediate 2: 1660 $cm^{-1}$ was the carbonyl peak of carbamate; 1698 $cm^{-1}$ was the peak of the carbonyl on the pyrimidine aromatic ring; 1725 $cm^{-1}$ was the carbonyl peak of the ester bond in the monomer of Intermediate 1; 1890 $cm^{-1}$ was the carbonyl peak of hydroxyethyl ester; and 3550 $cm^{-1}$ was the hydroxyl peak.

Step 3: Preparation of Component B

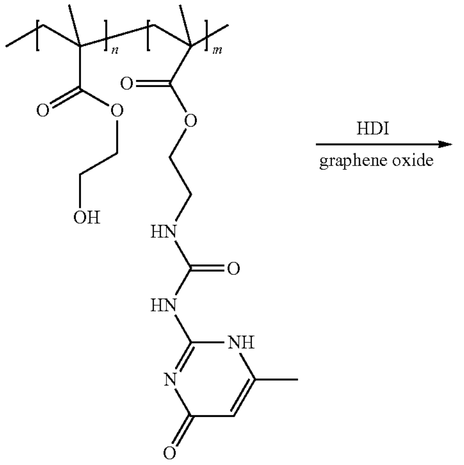

Intermediate 2

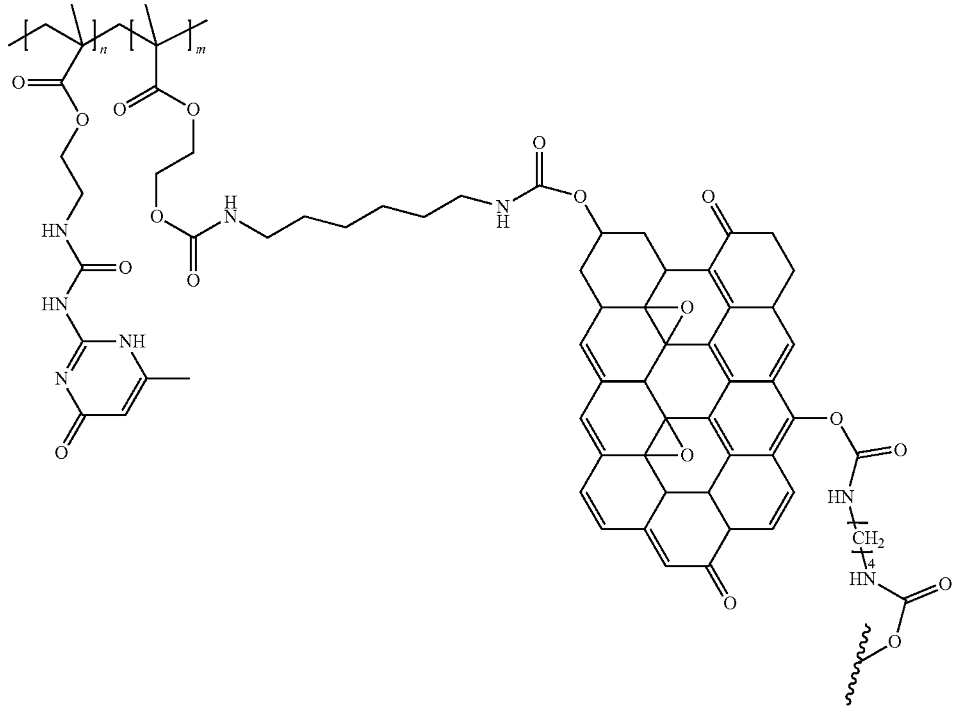

Compound B (wherein, n = 19, m = 4)

80 parts by weight of hexamethylene diisocyanate (HDI) was added into the reaction solution obtained in step 2 and reacted for 24 hours at 25° C. to obtain a polyurethane prepolymer, and then added 20 parts by weight of freeze-dried graphene oxide powder (purchased from Changzhou Sixth Element Materials Technology Co., Ltd.) into the polyurethane prepolymer solution, and stirred for 2 hours at 25° C., Finally, the solvent was removed by vacuum drying to obtain a black-brown viscous liquid, namely Component B, whose viscosity at 25° C. was 52000 mPa·s and the NCO content was 13.3%.

Example 2

The present embodiment provided a novel two-component polyurethane adhesive, which is composed of Component A and Component B with a mass ratio of 3:1; wherein:

The preparation method of Component A is as follows:

50 parts by weight of polyol of type BASF Sovermol® 815, together with 30 parts by weight of polyol of type of STEPANPOL PS-2002, 20 parts by weight of polyol of type of BASF Sovermol® 1092 Alcohol and 70 parts by weight of 2000 mesh aluminum hydroxide (purchased from Foshan Sanshui Jinge New Material Co., Ltd.) were added to a reaction kettle, and stirred at room temperature for 20 minutes, then added 1 part by weight of stannous octoate into the reaction kettle, and stirred and dispersed at room temperature for 1 hour, vacuum defoamed to obtain Component A, whose viscosity at 25° C. is 12000 mPa·s.

Wherein, Sovermol®815 is a polyester polyol with a viscosity of 4500-4900 mPa·s at 25° C.; PS-2002 is a polyester polyol with a viscosity of 3000-3200 mPa·s at 25° C.; and ®1092 is a polyether polyol with a viscosity of 2000-2300 mPa·s at 25° C.

Preparation of component B: The raw materials and preparation method of Component B were roughly the same as those in Example 1, and the only difference was that 80 parts by weight of hexamethylene diisocyanate (HDI) in step 3 of Example 1 was changed to 80 parts by weight of isophor Ketone Diisocyanate (IPDI). The specific preparation method is as follows:

Step 1: Preparation of Intermediate 1

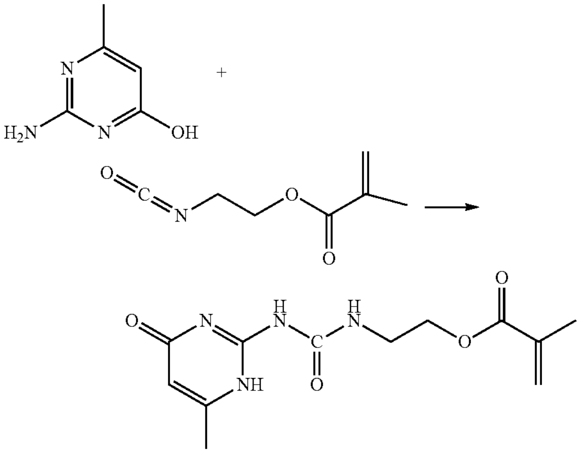

Intermediate 1

100 parts of 2-amino-4-hydroxy-6-methylpyrimidine was added into 200 parts of anhydrous N, N-dimethylformamide (DMF), after it was completely dissolved, quickly added 132 parts of isocyanoethyl methacrylate and reacted at 25° C. for half an hour. After the reaction completed, most of the solvent was removed by rotary evaporation, and the remaining solution was washed and dried to obtain a white product, namely Intermediate 1, with a yield of 95.2%.

The H NMR spectrum of Intermediate 1 (deuterated chloroform, ppm): there were three N—H peaks with chemical shifts between 10.2 and 13.1; one C═C—$H_2$ peak with chemical shifts at 6.21 and 5.55 respectively; one C—H peak on the pyrimidine ring with a chemical shift near 5.80; one O—$CH_2$ peak with a chemical shift between 4.25 and 4.28; one N—$CH_2$ peak with a chemical shift at 3.58; and multiple methyl peaks with chemical shifts between 1.88 and 2.25.

The infrared spectrum of Intermediate 1: 1660 $cm^{-1}$ was the carbonyl peak of carbamate; 1698 $cm^{-1}$ was the peak of the carbonyl on the pyrimidine aromatic ring; 1725 $cm^{-1}$ was the carbonyl peak of ester bond, and 3038 $cm^{-1}$ was the peak of carbon-carbon double bond.

Step 2: Preparation of Intermediate 2

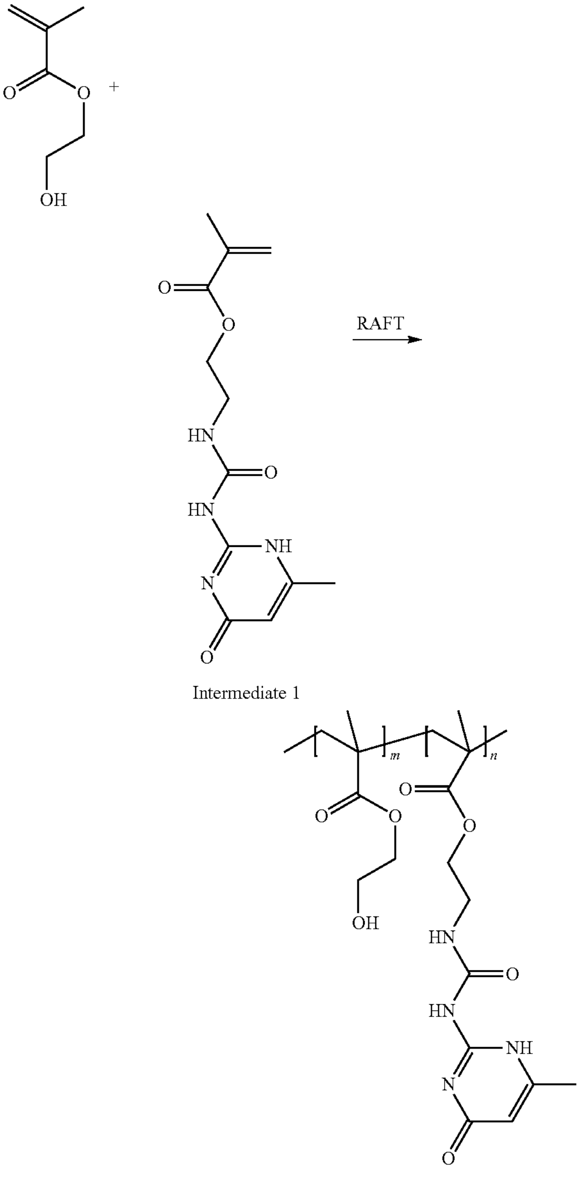

Intermediate 1

Intermediate 2

(wherein, n = 19, m = 4)

1 part by weight of chain transfer agent cumyl dithiobenzoate, together with 100 parts by weight of Intermediate 1 prepared in step 1, 10 parts by weight of hydroxyethyl methacrylate and 1 part by weight of azobisisobutyronitrile were dissolved in 250 parts by weight of anhydrous N,N-dimethylformamide; after the reaction device was sealed, it underwent three cycles of freezing-vacuuming-thawing-nitrogen flowing to ensure that the reaction was carried out under anhydrous and oxygen-free conditions. The reaction was carried out at 60° C. for 12 hours to obtain Intermediate 2 for the next reaction directly without purification.

The infrared spectrum of Intermediate 2: 1660 $cm^{-1}$ was the carbonyl peak of carbamate; 1698 $cm^{-1}$ was the peak of the carbonyl on the pyrimidine aromatic ring; 1725 $cm^{-1}$ was the carbonyl peak of the ester bond in the monomer of Intermediate 1; 1890 $cm^{-1}$ was the carbonyl peak of hydroxyethyl ester; and 3550 $cm^{-1}$ was the hydroxyl peak.

Step 3: Preparation of Component B

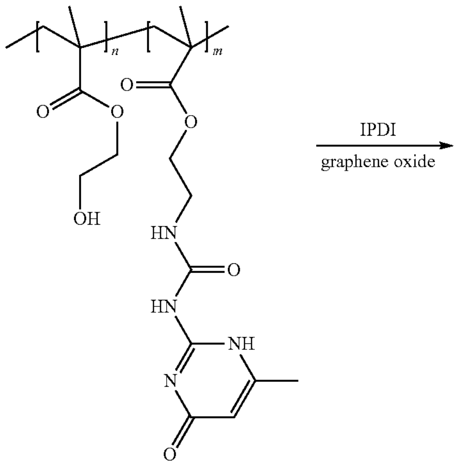

Intermediate 2

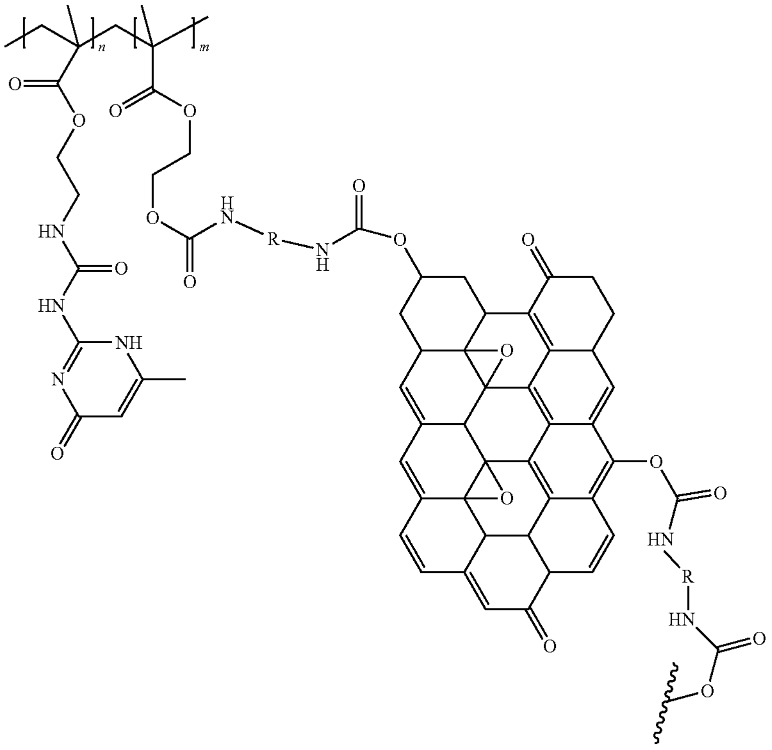

Compound B (wherein, n =19, m = 4 and R is 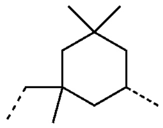 )

Wherein, the wavy line part of the Component B as above refers to the repeating chain structure, which can be the intermediate 2, or the graphene oxide.

80 parts by weight of Isophorone Diisocyanate (IPDI) was added into the reaction solution obtained in step 2 and reacted for 24 hours at 25° C. to obtain a polyurethane prepolymer, and then added 20 parts by weight of freeze-dried graphene oxide powder (purchased from Changzhou Sixth Element Materials Technology Co., Ltd.) into the polyurethane prepolymer solution, and stirred for 2 hours at 25° C. Finally, the solvent was removed by vacuum drying to obtain a black-brown viscous liquid, namely Component B, whose viscosity at 25° C. was 48000 mPa·s and the NCO content was 12.1%.

Comparative Example 1

The present comparative example provided a two-component polyurethane adhesive, which is composed of Component A and Component B with a mass ratio of 1:1.

The preparation method of Component A is as follows:

50 parts by weight of polyol of type BASF Sovermol® 815, together with 30 parts by weight of polyol of type of STEPANPOL PS-2002, 20 parts by weight of polyol of type of BASF Sovermol® 1092 Alcohol and 70 parts by weight of 2000 mesh aluminum hydroxide (purchased from Foshan Sanshui Jinge New Material Co., Ltd.) were added to a reaction kettle, stirred at room temperature for 20 minutes, then added 1 part by weight of stannous octoate into the reaction kettle, and stirred and dispersed at room temperature for 1 hour, vacuum defoamed to obtain Component A, whose viscosity at 25° C. was 12000 mPa·s.

Wherein, Sovermol®815 is a polyester polyol with a viscosity of 4500-4900 mPa·s at 25° C.; PS-2002 is a polyester polyol with a viscosity of 3000-3200 mPa·s at 25° C.; and ®1092 is a polyether polyol with a viscosity of 2000-2300 mPa·s at 25° C.

The preparation method of Component B is as follows:

100 parts by weight of polyether polyol (PPG-2000) from Nanjing Boben Polyurethane Co., Ltd. and 2 parts by weight of 1,4-butanediol were added into a reaction kettle, and stirred under vacuum at 110° C. for 3 hours. Then 1 part by weight of stannous octoate together with 120 parts by weight of Wanhua Chemical's WANNATE® HDI were added into the reaction kettle to react for 8 hours at 60° C. The solvent was vacuum defoamed for 1 hour to obtain a white transparent viscous liquid, namely Components B, whose viscosity was 40000 mPa·s at 25° C., and the NCO content was 12.8%.

Comparative Example 2

The present comparative example provided a two-component polyurethane adhesive, which is composed of Component A and Component B with a mass ratio of 1:1; wherein:

The preparation method of Component A is as follows:

50 parts by weight of polyol of type BASF Sovermol® 815, together with 30 parts by weight of polyol of type of STEPANPOL PS-2002, 20 parts by weight of polyol of type of BASF Sovermol® 1092 Alcohol, 1 part by weight of antioxidant (Tianjin Li'anlong New Material Co., Ltd., model 330), 5 parts by weight of flame retardant (XS-FR-708 of Xusen Non-halogen Smoke Suppressing Flame Retardant Co., Ltd.) and 70 parts by weight of 2000 mesh aluminum hydroxide (purchased from Foshan Sanshui Jinge New Material Co., Ltd.) were added into a reaction kettle, stirred at room temperature for 20 minutes, then added 1 part by weight of stannous octoate into the reaction kettle, and stirred and dispersed at room temperature for 1 hour, vacuum defoamed to obtain Component A, whose viscosity at 25° C. is 12000 mPa·s.

Wherein, Sovermol®815 is a polyester polyol with a viscosity of 4500-4900 mPa·s at 25° C.; PS-2002 is a polyester polyol with a viscosity of 3000-3200 mPa·s at 25° C.; and ®1092 is a polyether polyol with a viscosity of 2000-2300 mPa·s at 25° C.

The preparation method of Component B is as follows:

100 parts by weight of polyether polyol (PPG-2000) from Nanjing Boben Polyurethane Co., Ltd. and 2 parts by weight of 1,4-butanediol were added into a reaction kettle, and stirred under vacuum at 110° C. for 3 hours. Then 1 part by weight of stannous octoate together with 120 parts by weight of liquefied MDI of type WANNATE®100-LL by Wanhua Chemical were added into the reaction kettle to react for 8 hours at 60° C. The solvent was vacuum defoamed for 1 hour to obtain a white transparent viscous liquid, namely Components B, whose viscosity was 45000 mPa·s at 25° C., and the NCO content was 12.6%.

The following performance tests were performed on the two-component polyurethane adhesives prepared in the above-mentioned Examples 1-2 and Comparative Examples 1-2.

1. Mechanical Properties and Flame-Retardant Properties Tests

The mechanical properties and flame-retardant properties of the two-component polyurethane adhesives prepared in the above-mentioned Examples 1-2 and Comparative Examples 1-2 were tested after curing at 60° C. for 6 hours. The specific method was as follows:

Test method for Hardness: Part 1 of Test method for indentation hardness of vulcanized or thermoplastic rubber: Shore durometer method (Shore hardness) according to GB/T 531.1-2008.

Test method for Adhesion: Determination of tensile shear strength of adhesives (rigid material to rigid material) according to GB/T 7124-2008.

Test method for flame retardancy: Flame retardant sealant for construction according to GB/24267-2009.

Test method for tensile strength: Part 2 of Determination of tensile properties of plastics: determination of molded and extruded plastics according to GB/T 1040.2-2006.

The test results are shown as below in Table 1.

TABLE 1

| Samples | Color | Hardness (HD) | Shear strength of stainless steel (MPa) | Shear strength of transparent PC board (MPa) | Flame retardancy | Tensile Strength (MPa) |
|---|---|---|---|---|---|---|
| Example 1 | Black | 54 | 12.5 | 10.6 | V-0 | 13.8 |
| Example 2 | Black | 54 | 12.1 | 10.3 | V-0 | 13.3 |
| Comparative Example 1 | White | 40 | 4.7 | 4.1 | V-2 | 4.8 |
| Comparative Example 2 | White | 50 | 8.5 | 9.0 | V-0 | 10.3 |

Analysis of the results in Table 1 shows that:

Comparing the polyurethane adhesives prepared in Example 1 and Example 2, the macroscopic mechanical properties of the polyurethane adhesives prepared with different aliphatic isocyanates as raw materials were not significantly different.

Comparing Example 1 and Comparative Example 1, the performances, including hardness, adhesive strength, tensile strength and flame retardancy of the polyurethane adhesive which introduced ureidopyrimidinone and graphene oxide (Example 1) were significantly improved than those of the polyurethane adhesive which did not introduce the above-mentioned functional groups (Comparative Example 1). This is because the ureidopyrimidinone structure in the molecule can form a quadruple hydrogen bond, which strengthens the micro-phase separation of the soft and hard chain forging of the polyurethane adhesive, and has stronger macroscopic mechanical properties, therefore, the hardness, shear strength and tensile strength are all significantly improved. While the introduction of graphene into the polyurethane backbone improves the flame retardancy of the polyurethane adhesive.

Comparing Example 1, Comparative Example 1 and Comparative Example 2, the hardness, shear strength and tensile strength of the polyurethane adhesive of Comparative Example 2 were significantly higher than those of the polyurethane adhesive of Comparative Example 1, while the hardness, shear strength and tensile strength of the polyurethane adhesive of Example 1 were significantly higher than those of the polyurethane adhesive of Comparative Example 2. It shows that the rigidity of the polyurethane adhesive prepared with aromatic isocyanate as raw material is stronger than that of the polyurethane adhesive prepared with aliphatic isocyanate as raw material. However, after the introduction of ureidopyrimidinone and graphene oxide into the aliphatic polyurethane backbone (Example 1), the hardness, shear strength and tensile strength were higher than those of the aromatic polyurethane adhesive (Comparative Example 2). The flame retardancy grade of the polyurethane adhesive of Comparative Example 2 was V-0 due to the addition of a flame retardant, while the flame retardancy grade of the polyurethane adhesives of Examples 1 and 2 without addition of excess flame retardant could also reach V-0.

2. Aging Resistance Test

The two-component polyurethane adhesives prepared in the above Examples 1-2 and Comparative Examples 1-2 were made into PC/PC shear samples according to the GB/T 7124-2008 method, and their aging resistance were tested after curing at 25° C. for 8 days. The specific method is as follows:

Test method for resistance to high temperature and high humidity (dual 85,2000 hours): Part 2 of Environmental Test according to GB/T 2423.50-2012: Test Methods Test Cy: Constant Damp Heat Mainly used for accelerated testing of components.

Test method for resistance to high and low temperature cycles (−40° C. to 80° C., 1000 times): Part 2 of Environmental Test according to GB/T 2423.22-2012: Test Method Test N: Temperature Change.

The test results are shown as below in Table 2.

TABLE 2

| | Resistance to high temperature and high humidity PC/PC Shear Strength (MPa) | | Resistance to high and low temperature cycles PC/PC Shear Strength (MPa) | |
|---|---|---|---|---|
| Samples | Before test | After test | Before test | After test |
| Example 1 | 10.5 | 9.0 | 10.7 | 10.2 |
| Example 2 | 10.4 | 9.2 | 10.7 | 10.1 |
| Comparative Example 1 | 4.0 | 2.1 | 4.2 | 2.5 |
| Comparative Example 2 | 9.0 | 4.7 | 9.2 | 4.3 |

Analysis of the results in Table 2 shows that: after the introduction of ureidopyrimidinone and graphene oxide into the main chain of aliphatic polyurethane, the resistance to high temperature and high humidity and resistance to high and low temperature cycles of the polyurethane adhesive were significantly improved.

3. Resistance to Natural Light Test

Dumbbell-shaped samples were prepared according to GB/T 1040.2-2006 with the two-component polyurethane adhesives prepared in Example 1, Comparative Example 1 and Comparative Example 2, cured at 25° C. for 8 days, and then the samples were placed on the roof of a house and exposed to natural light for 100 days, and the samples were taken for tensile strength testing periodically.

The test results are shown as below in Table 3.

TABLE 3

| Samples | 5 days (MPa) | 10 days (MPa) | 20 days (MPa) | 50 days (MPa) | 80 days (MPa) | 100 days (MPa) |
|---|---|---|---|---|---|---|
| Example 1 | 13.6 | 13.5 | 13.2 | 13.0 | 12.8 | 12.7 |
| Comparative Example 1 | 4.8 | 4.5 | 4.2 | 3.7 | 3.3 | 3.0 |
| Comparative Example 2 | 10.0 | 9.8 | 8.5 | 7.2 | 6.0 | 5.1 |

Analysis of the results in Table 3 shows that: after the introduction of ureidopyrimidinone and graphene oxide into the main chain of aliphatic polyurethane, the resistance to natural light of the polyurethane adhesive was significantly improved. The adhesive in Comparative Example 1 was an aliphatic polyurethane adhesive, which had a relatively small shear strength attenuation ratio of the 100-day light test, but the mechanical strength of the colloid itself was not high enough. However, in Comparative Example 2, even if an anti-aging agent was added, the strength of the colloid was still greatly attenuated with the prolongation of the exposure to natural light.

From the results of Table 1 to Table 3, it can be seen that after the introduction of ureidopyrimidinone and graphene oxide into the main chain of aliphatic polyurethane, the colloidal strength, bond strength, mechanical properties and aging resistance of the polyurethane adhesive can be significantly improved.

The technical features of the above-described embodiments can be combined arbitrarily. To simplify description, all possible combinations of the technical features of the above embodiments are not described. However, as long as there is no contradiction in the combination of these technical features, all should be considered to be the scope recorded in the description.

The above-described embodiments represent several implementations of the present disclosure only. The descriptions of the embodiments are relatively specific and detailed, but may not therefore be construed as the limitation on the patent scope of the present disclosure. It should be noted that a person of ordinary skill in the art may further make several variations and improvements without departing from the concept of the present disclosure. These variations and improvements all fall within the protection scope of the present disclosure. Therefore, the patent protection scope of the present disclosure shall be defined by the appended claims.

What is claimed is:

1. A modified polyurethane prepolymer, is prepared from raw materials comprising the following components: polyurethane prepolymer and graphene oxide; wherein, the polyurethane prepolymer is prepared from raw materials including the following components: copolymer containing ureidopyrimidinone groups, and aliphatic isocyanate; wherein the copolymer containing ureidopyrimidinone groups is formed by copolymerization of raw materials including the following components: alkyl acrylate ureidopyrimidinone, and hydroxyethyl alkyl acrylate; wherein, the alkyl acrylate ureidopyrimidinone has a structure shown in Formula (I):

(I)

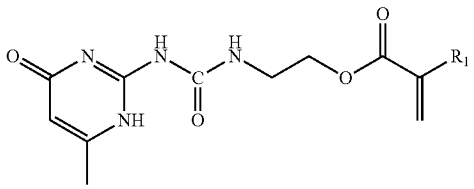

the hydroxyethyl alkyl acrylate has a structure shown in Formula (II):

(II)

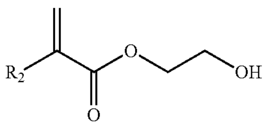

wherein, $R_1$ is $C_1$-$C_6$ alkyl; $R_2$ is H, or $C_1$-$C_6$ alkyl.

2. The modified polyurethane prepolymer according to claim 1, wherein, the copolymer containing ureidopyrimidinone groups has a structure shown in Formula (III):

(III)

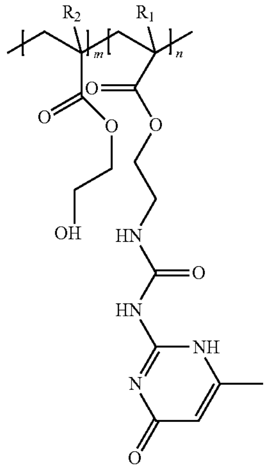

wherein, n is 1-100, m is 1-10; $R_1$ is $C_1$-$C_6$ alkyl; $R_2$ is H or $C_1$-$C_6$ alkyl.

3. The modified polyurethane prepolymer according to claim 1, wherein the aliphatic isocyanate is at least one of the following: hexamethylene diisocyanate, 4,4'-dicyclohexylmethane diisocyanate, isophorone diisocyanate, 1,4-cyclohexyl diisocyanate and methylcyclohexyl diisocyanate.

4. The modified polyurethane prepolymer according to claim 1, having a structure shown in Formula (IV):

(IV)

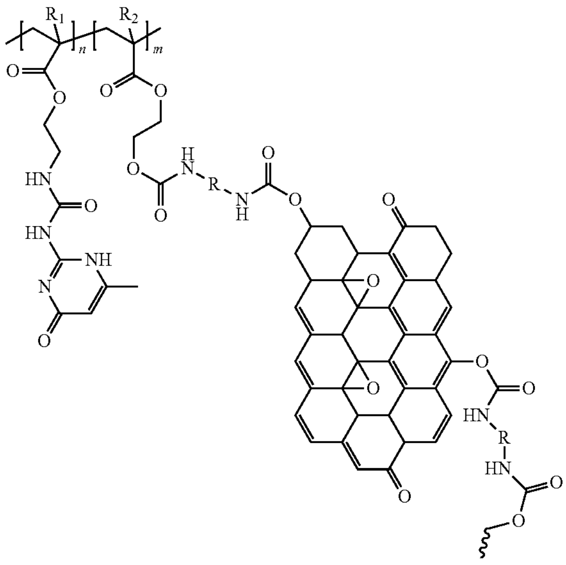

wherein, n is 1-100, m is 1-10; $R_1$ is $C_1$-$C_6$ alkyl; $R_2$ is H or $C_1$-$C_6$ alkyl; and R is $-(CH_2)_6-$,

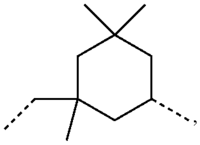
,
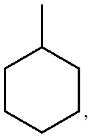
,

-continued

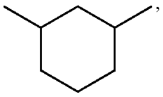
,
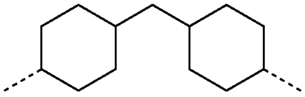
, or
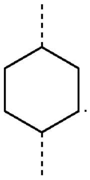
.

5. The modified polyurethane prepolymer according to a claim 1, wherein $R_1$ is methyl; and/or $R_2$ is H or methyl.

6. The modified polyurethane prepolymer according to claim 2, wherein $R_1$ is methyl; and/or $R_2$ is H or methyl.

7. The modified polyurethane prepolymer according to claim 4, wherein $R_1$ is methyl; and/or $R_2$ is H or methyl.

8. The modified polyurethane prepolymer according to claim 1, wherein a mass ratio of the alkyl acrylate ureidopyrimidinone, the hydroxyethyl alkyl acrylate, the aliphatic isocyanate and the graphene oxide is 100:(5-20):(60-90):(1-30).

9. The modified polyurethane prepolymer according to claim 8, wherein the mass ratio of the alkyl acrylate ureidopyrimidinone, the hydroxyethyl alkyl acrylate, the aliphatic isocyanate and the graphene oxide is 100:(8-12):(75-85):(15-25).

10. The modified polyurethane prepolymer according to claim 1, wherein NCO content of the modified polyurethane prepolymer is 11% to 14%, and its viscosity at 25° C. is 30000 mPa·s to 70000 mPa·s.

11. The modified polyurethane prepolymer according to claim 4, wherein NCO content of the modified polyurethane prepolymer is 11% to 14%, and its viscosity at 25° C. is 30000 mPa·s to 70000 mPa·s.

12. A preparation method of the modified polyurethane prepolymer according to claim 1, comprising the following steps:

step 1: dissolving a chain transfer agent, together with the alkyl acrylate ureidopyrimidinone, hydroxyethyl alky acrylate and an initiator in an organic solvent to carry out copolymerization reaction to obtain a copolymer containing the ureidopyrimidinone groups, thereby forming a first solution;

step 2: adding the aliphatic isocyanate to the first solution after the reaction in step 1, to react, and obtaining the polyurethane prepolymer, thereby forming a second solution; and step 3: adding the graphene oxide to the second solution after the reaction in step 2 to react, and obtaining the modified polyurethane prepolymer.

13. The preparation method of the modified polyurethane prepolymer according to claim 12, wherein the chain transfer agent is at least one of the following: cumyl dithiobenzoate, tert-buty benzodithioate, bis(benzylsulfanyl)methanethione and 2-phenyl-2-propylbenzodithioate; and/or, the initiator is azobisisobutyronitrile and/or benzoyl peroxide.

14. The preparation method of the modified polyurethane prepolymer according to claim 13, wherein an amount of the chain transfer agent is 0.1 wt % to 2 wt % of the alkyl acrylate ureidopyrimidinone; and an amount of the initiator is 0.1 wt % to 2 wt % of the alkyl acrylate ureidopyrimidinone.

15. The preparation method of the modified polyurethane prepolymer according to claim 12, wherein a temperature of the copolymerization reaction in step 1 is 50° C. to 70° C., and a time of the copolymerization reaction is 6 hours to 18 hours; and/or, a temperature of the reaction in step 2 is 20° C. to 30° C., and a reaction time is 18 hours to 28 hours; and/or, a temperature of the reaction in step 3 is 20° C. to 30° C., and a reaction time is 1 hour to 3 hours.

16. A two-component polyurethane adhesive, comprising component A and component B; in parts by weight, the component A is prepared from raw materials comprising the following components: 100 parts of polyol; 0.01 parts~5 parts of catalyst; and 50 parts~100 parts of inorganic filler, and the component B is the modified polyurethane prepolymer according to claim 1.

17. The two-component polyurethane adhesive according to claim 16, wherein a mass ratio of the component A and the component B is (1-3):1; and/or, the polyol is one or more of the following: phenyl-modified polyether polyol, polyether polyol, polyester polyol and short-chain polyol; and/or, the catalyst is an organotin catalyst and/or a tertiary amine catalyst; and/or, the inorganic filler is at least one of the following: ultrafine calcium carbonate, nano-calcium carbonate and aluminum hydroxide.

18. The two-component polyurethane adhesive according to claim 17, wherein a viscosity of the polyol at 25° C. is 1000 cps to 5000 cps;

the organotin catalyst is dibutyltin dilaurate and/or stannous octoate, and the tertiary amine catalyst is triethylenediamine, triethanolamine and/or triethylamine;

a particle size of the aluminum hydroxide is 1000 mesh to 2000 mesh.

19. A preparation method of the two-component polyurethane adhesive according to claim 16, comprising the following steps:

preparation of the component A: mixing the polyol with the inorganic filler, then adding the catalyst, stirring and dispersing, and vacuum defoaming to obtain the component A;

preparation of the component B:

step 1: dissolving a chain transfer agent, together with the alkyl acrylate ureidopyrimidinone, hydroxyethyl alky acrylate and an initiator in an organic solvent to carry out copolymerization reaction to obtain a copolymer containing the ureidopyrimidinone groups, thereby forming a first solution;

step 2: adding the aliphatic isocyanate to the first solution after the reaction in step 1 to react, and obtaining the polyurethane prepolymer, thereby forming a second solution;

step 3: adding the graphene oxide to the second solution after the reaction in step 2 to react, and obtaining the modified polyurethane prepolymer.

* * * * *